US005317871A

United States Patent [19]

Ito et al.

[11] Patent Number: 5,317,871

[45] Date of Patent: Jun. 7, 1994

[54] CIRCUIT CAPABLE OF VARYING PUMP DISCHARGE VOLUME IN CLOSED CENTER-LOAD SENSING SYSTEM

[75] Inventors: Daijiro Ito, Hirakata; Hiroshi Imai, Tsuzuki, both of Japan

[73] Assignee: Kabushiki Kaisha Komatsu Seisakusho, Tokyo, Japan

[21] Appl. No.: 30,284

[22] PCT Filed: Sep. 27, 1991

[86] PCT No.: PCT/JP91/01295

§ 371 Date: Mar. 26, 1993

§ 102(e) Date: Mar. 26, 1993

[87] PCT Pub. No.: WO92/06305

PCT Pub. Date: Apr. 16, 1992

[30] Foreign Application Priority Data

Sep. 28, 1990 [JP] Japan .................................. 2-259241

[51] Int. Cl.$^{5}$ .............................................. F16D 31/02

[52] U.S. Cl. ......................................... 60/452; 60/423

[58] Field of Search ................. 60/422, 423, 445, 452, 60/447, 451

[56] References Cited

U.S. PATENT DOCUMENTS

| | | | |
|---|---|---|---|
| 3,543,508 | 12/1970 | Schwab | 60/445 X |
| 3,754,400 | 8/1973 | Parquet | 60/445 |
| 3,826,090 | 7/1974 | Bahl | 60/452 X |
| 4,810,171 | 3/1989 | Krebs | 60/447 X |
| 5,146,746 | 9/1992 | Nagai et al. | 60/445 |
| 5,249,421 | 10/1993 | Lunzman | 60/442 |

FOREIGN PATENT DOCUMENTS

| | | | |
|---|---|---|---|
| 65304 | 11/1982 | European Pat. Off. | 60/452 |
| 57-116965 | 7/1982 | Japan . | |
| 59-91238 | 5/1984 | Japan . | |
| 60-38561 | 9/1985 | Japan . | |
| 2-261902 | 10/1990 | Japan . | |

*Primary Examiner*—Edward K. Look
*Assistant Examiner*—John Ryznic
*Attorney, Agent, or Firm*—Richards, Medlock & Andrews

[57] ABSTRACT

A closed center-load sensing system, capable of varying a pump discharge volume easily and with a high degree of accuracy, includes a power source having an indicator for indicating a rotational speed, a variable volume hydraulic pump driven by the power source, actuators driven by pressure oil discharged from the variable volume hydraulic pump, change-over valves for controlling the flow of the pressure oil, an indicator for setting the rotational speed of the power source in a load sensing system in which the pressure difference between the pump pressure and the actuator load pressure is maintained at a predetermined pressure and the rate of flow of a discharge from the variable capacity hydraulic pump is varied when the pressure difference between a pump pressure and an actuator load pressure varies, a controller for computing and outputting a command signal for the rotational speed of the power source in response to a command signal from the indicator, and an electronic proportional control governor for controlling the rotational speed of the power source in response to a command signal from the controller, whereby the pressure difference is set.

20 Claims, 6 Drawing Sheets

CIRCUIT CAPABLE OF VARYING PUMP DISCHARGE VOLUME IN CLOSED CENTER-LOAD SENSING SYSTEM

BACKGROUND OF THE INVENTION

Field of the Invention

The present invention relates to a circuit capable of varying a pump discharge volume in a closed center-load sensing system and, more particularly, to an improvement in a circuit capable of varying a pump discharge volume, which circuit is suitable for use with construction machines such as power shovels.

Description of the Related Art

In one embodiment of a conventional construction machine such as a power shovel, as shown in FIG. 6, two pumps 53 and 54, driven via a power take-out apparatus (hereinafter referred to as a PTO) 52 disposed on an engine 51, are connected by separate pipes 61 and 62, respectively, to two change-over valves 59 and 60 (hereinafter referred to as "two pumps/two valves") for changing an oil pressure applied to a boom actuator 55, an arm actuator 57, and a turning actuator 58, for operating a construction machine.

In an alternative system, as shown in FIG. 7, oil discharged from two pumps 71 and 72 flows through pipes 74 and 75 into a common pipe to change-over valve unit 73 (hereinafter referred to as "two pumps/one valve") having two stacked type change-over valves connected in parallel to actuators 57 and 58 of various types. A closed center-load system is used in the change-over valve unit 73 in the above case, and a load sensing system 80, for varying the respective discharge volumes in accordance with the valve opening irrespective of a load pressure P, is used with the two pumps 71 and 72. The discharge volume of the single pump 72 is changed by shutting off a flow control valve 81.

However, since the two pumps 53 and 54 of the "two pumps/two valves" shown in FIG. 6 are driven by using the PTO 52, and are connected to two change-over valves 59 and 60, placed in different places, by means of two pipes, the construction is complex so that a wide space is needed and the cost thereof is high. The "two pumps/one valve" shown in FIG. 7 has the same drawback as the above construction because it has two pumps, and also has a performance problem described below, with reference to FIG. 8.

① When the spool stroke of the change-over valve is in an S range, i.e., in a throttling range (stroke and flow-rate characteristics), even if just the one pump 72 is used instead of the two pumps 71 and 72, the fine control curve (A) becomes constant with respect to stroke and cannot be made variable. Or, when only the pump 72 is used, since a pump capable of discharging a large amount must be used, the fine control curve (A) is also constant.

② Even if the flow control valve 81 is changed and only the single pump 72 is discharged, the problem of item ① is not solved though the maximum flow-rate is reduced from (B) to (C).

In addition, to simplify the construction and reduce the space required for the apparatus, "one pump/one valve" may be used. However, when the flow-rate required for a maximum discharge amount of the pump is low, as in the turning of a power shovel, even if the rotation of the pump is decreased by an engine, the maximum speed, i.e., the turning speed (D) of the actuator, does not change, as shown in FIG. 9, causing a problem in that the actuator does not turn as fast as the operator thinks it will.

Accordingly, the inventor of the present invention has proposed in Japanese Patent Laid-Open No. 2-261902 that the discharge volume of a pump be changed by varying the discharge pressure of a pump used to change a change-over valve, the load pressure of an actuator, and the energization force of a spring, or that the discharge volume of a pump be changed in accordance with the rotational speed of an engine. As a result, since the discharge volume of a pump changes in accordance with the rotational speed of an engine and since the operation speed of a construction machine is in accordance with the setting of the rotational speed of the engine, the actuator does not turn as fast as the operator thinks it will.

In recent years, there has been a demand for construction machines such as hydraulic shovels that can be operated easily and with a high degree of accuracy by even an amateur, caused by the fact that there is a lack of experienced operators due to a manpower shortage, or caused by the fact that the level of operating skill is low due to an increase in the number of operations by a novice because of rental machines, and also caused by the fact that there is a demand for a construction method, such as horizontal excavation for leveling the ground or normal excavation for smoothing sloped ground. A hydraulic shovel has been developed which is capable of performing horizontal excavation or normal excavation since, for example, when only the operation lever of a boom is operated, a boom cylinder and an arm cylinder are automatically operated under the control of a controller.

Since a command value for varying the discharge volume of a pump is determined in such a way that the rotational speed of an engine is detected by a rotary sensor and a command is issued as in the above description, when, for example, a bucket abuts a rock during horizontal excavation and the load varies, a variation due to the above command value is added to a variation due to a delay in an increase in the discharge volume of the pump in consequence of a sharp change (FIG. 10) in the rotational speed of the engine, thus increasing the variation in the discharge volume of the pump. As a result, in some cases, the operation of the boom cylinder is not synchronized with that of the arm cylinder, making it impossible to perform horizontal excavation with a high degree of accuracy.

SUMMARY OF THE INVENTION

The present invention has been achieved by taking into consideration the problems of the prior art. An object of the present invention is to provide a closed center-load sensing system capable of varying the discharge volume of a pump with a high degree of accuracy and with ease.

A circuit capable of varying a pump discharge volume in a closed center-load sensing system in accordance with the present invention comprises a power source having a rotational speed; a variable volume hydraulic pump driven by the power source; actuators driven by the pressurized oil discharged from the variable volume hydraulic pump; change-over valves for controlling the flow of the pressurized oil from the pump to the actuators; an indicator for setting the rotational speed of the power source in a load sensing system in which the rate of flow of a discharge from the variable volume hydraulic pump is controlled so that the pressure difference between a pump pressure and an actuator load pressure is maintained at a predetermined value and the rate of flow of a discharge from the variable capacity hydraulic pump is varied when the pressure difference between a pump pressure and an actuator load pressure varies; a controller for computing and outputting a command signal for the rotational speed of the power source in response to a set signal from the indicator; and an electronic proportional control governor for controlling the rotational speed of the power source in response to the command signal from the controller, whereby the pressure difference between the pump pressure and the actuator load pressure is set by the indicator. This indicator indicates the pressure difference at the stroke position of a throttle dial. The controller is equipped with a changeover switch for selecting the operation of the actuator and an electromagnetic pressure proportional valve for controlling a regulator of a pump.

With the above-described construction, when the discharge volume of the pump, for which a required flow rate is low, is controlled by the rotational speed of the pump, a fixed command value can be obtained at the stroke position of the throttle dial and the discharge volume can be independent of a variation in a load, since the rotational speed of the power source for driving the pump is controlled in accordance with the stroke position of a throttle dial. Therefore, a stable discharge volume of a pump with a small amount of flow-rate variations can be obtained.

The rate of flow to the actuator can vary in the range of a fine control curve with respect to the stroke of the change-over valve, making fine control of the actuator possible. Even if the load is varied, the variation in the discharge volume of the pump is small. As a result, a stable discharge volume of a pump can be obtained in accordance with a stroke position of a throttle dial and a stroke position (the position of an operation lever) of a change-over valve, thus improving the accuracy of construction methods such as horizontal excavation or normal excavation and making it easy for even a novice to perform an operation.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENT

A preferred embodiment of a circuit capable of varying a pump discharge volume in a closed center-load sensing system in accordance with the present invention will be explained in detail below with reference to the accompanying drawings.

Figure 1:
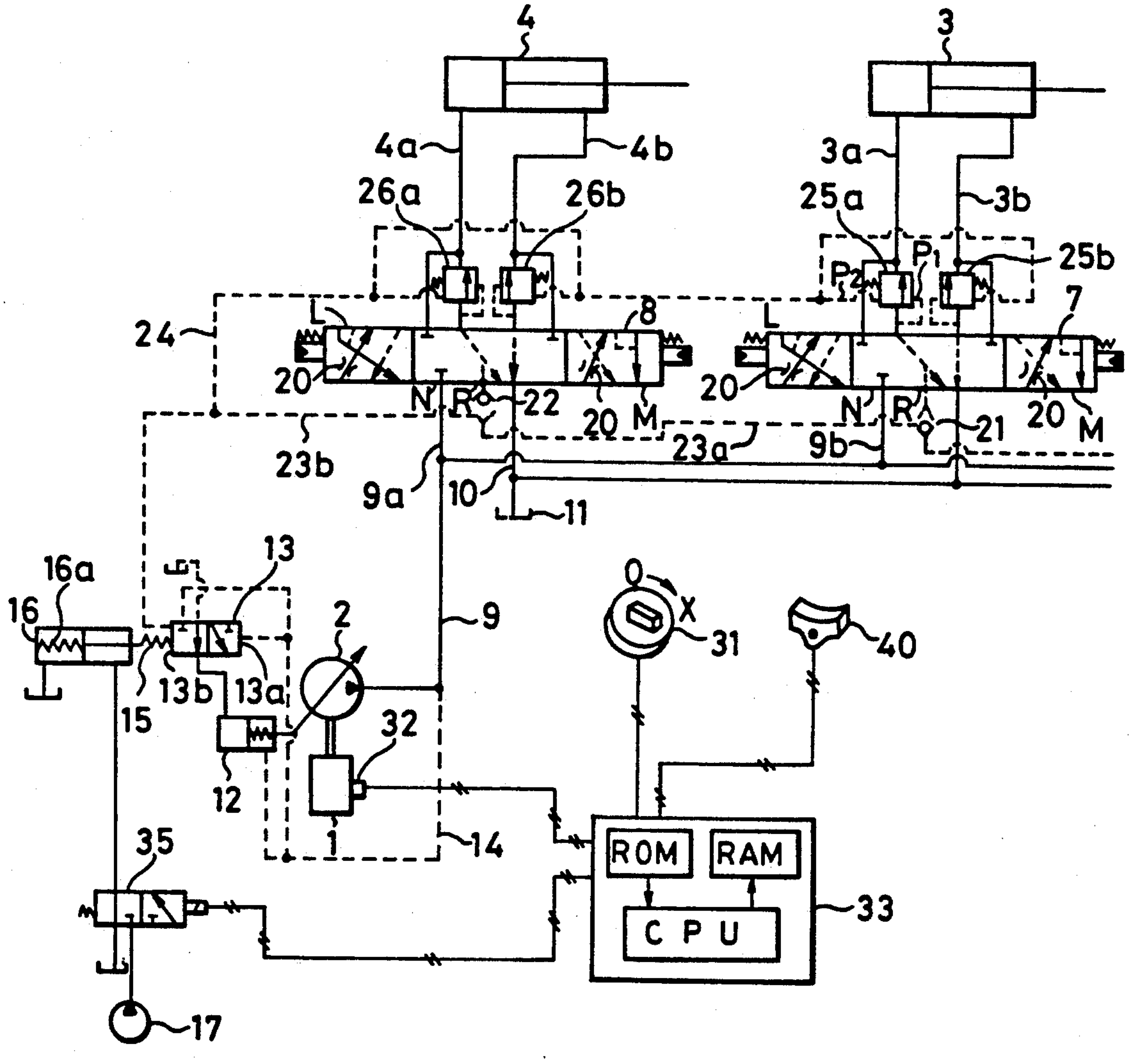
FIG. 1 is an illustration of the entire construction of a circuit capable of varying a pump discharge volume in a closed center-load sensing system in accordance with an embodiment of the present invention.
Figure 2:
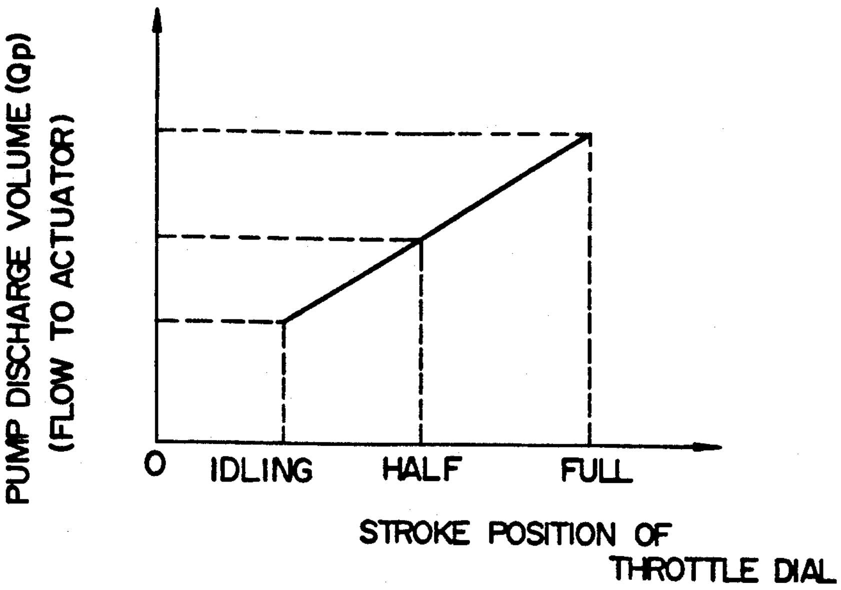
FIG. 2 is a chart illustrating the relationship between the stroke position of a throttle dial and the discharge volume of a pump in accordance with the present invention.

In FIG. 1, a power source, i.e., an engine 1, a variable volume hydraulic pump 2 (hereinafter referred to as a pump 2) driven by the engine 1, and a boom actuator 3 and an arm actuator 4 or the like for operating a construction machine are arranged. Stacked type change-over valves 7 and 8, each having a closed center, for changing the rate of flow to these actuators 3 and 4, are coupled as one unit, and the valves 7 and 8 are connected to the pump 2 through a pipe 9, and the valves 7 and 8 are connected to a tank 11 through a pipe 10. A regulator 12 for varying the discharge volume of the pump 2 is connected to a regulator valve 13 (hereinafter referred to as a valve 13) and to a pilot pipe 14 which branches from the pipe 9 of the pump 2. The regulator 12 controls a discharge volume Qp of the pump 2 while the regulator 12 is receiving the discharge pressure Pp of the pump 2. The valve 13 is of a "three ports/two positions" construction, and changing of the position of the valve 13 is controlled by the discharge pressure of the pump 2 acting on an end 13*a* of the valve 13, the maximum pressures of the actuators 3 and 4 acting on the other end 13*b*, and a spring 15 whose energization force is variable. A regulator 16 is connected to the spring 15. The regulator 16 receives pressurized oil from a fixed volume pump 17 (hereinafter referred to as a pump 17) via a pressure proportional valve 35 and changes the mounting length of the spring 15, thereby varying the energization force thereof. The regulator 16 has a spring 16*a* contained therein. The spring 16*a* is contracted by oil pressure from the pump 17. Pipes 9*a* and 9*b* connect the change-over valves 7 and 8 to the pipe 9 from the pump 2, pipes 3*a* and 3*b* are connected to the boom actuator 3, and pipes 4*a* and 4*b* are connected to the arm actuator 4. The change-over valves 7 and 8 can be switched to three positions L, M, and N, and the pump port is closed in the neutral position N. The flow rate is restricted by a variable throttle 20, of a throttle ring provided on the spool, in a step of shifting from the neutral position N to change-over position L or M. The variable throttle 20 (hereinafter referred to as a throttle 20) has a predetermined area at change-over positions L and M, making constant the flow rate therethrough. The variable throttle 20 is connected to shuttle valve 21 or 22 through a port R at each of these positions. The shuttle valves 2 and 22 are connected to each other by pilot pipe 23*a*, and are connected through pipe 23*b* and a branched pilot pipe 24 to pressure reducing valves 25*a*, 25*b*, 26*a* and 26*b* inserted respectively into pipes 3*a*, 3*b*, 4*a* and 4*b* of the actuators 3 and 4. A throttle dial 31 for setting the rotational speed of the engine 1, a controller 33 for computing the desired rotational speed of the engine 1 in response to a set signal from the throttle dial 31 and outputting a command signal to an electronic proportional control governor 32, and the electronic proportional control governor 32 for controlling the rotational speed of the engine 1 in accordance with a command signal from the controller 33 are connected to each other by wiring. Further, the controller 33 reads out, for example, a command signal for varying the discharge volume of the pump 2, as shown in FIG. 2, which has been stored in accordance with the stroke position (X) of the throttle dial 31, and outputs this command signal to the pressure proportional valve 35 connected to the regulator 16. The pressure proportional valve 35 controls the oil pressure of the pump 17 in accordance with a command signal from the controller 33 and supplies the oil pressure to the regulator 16. The regulator 16 varies the energization force of the spring 15 by gradually varying the mounting length of the spring 15 connected to the regulator 16 in proportion to the oil pressure, and thereby controls the regulator valve 13 for varying the discharge volume of the pump 2. Although the regulator 16 is operated so as to reduce the energization force of the spring 15 in this embodiment, the regulator 16, on the contrary, can be operated so as to increase the energization force.

A change-over switch 40 for operating or stopping the controller 33 is connected to the controller 33. The change-over valves 7 and 8 are switched in response to a pressure command from a pilot proportional pressure valve or the like in accordance with the operation of a lever provided in proximity to an unillustrated operator's seat. Although a command is issued in the form of pressure in this embodiment, a command can also be issued in the form of an electric current. The area of the throttle 20 can be at a maximum in the variable throttle instead of a fixed area at change-over positions L and M.

Next, the operation of this circuit will be explained. When an ordinary operation is performed without turning on the change-over switch 40, for example, if the boom actuator 3 is operated, the change-over valve 7 is switched from the neutral position N to the change-over position L or M in accordance with the operation of a lever provided in proximity to an unillustrated operator's seat. Thereupon, since the flow through pipe 9 is restricted by the throttle 20 (throttle area: Z $mm^2$), the discharge pressure Pp of the pump 2 becomes higher than a load pressure of the boom, i.e., a pressure Pa of the pipes 3*a* and 3*b* of the actuator 3 by a predetermined amount of pressure Pc. It follows that:

$$Pp = Pa + Pc \tag{1}$$

The predetermined amount of pressure Pc is set by the energization force of the spring 15 connected to the regulator 16. The switching pressure of the valve 13 is controlled so that the pressure of the throttle 20 becomes the predetermined amount of pressure Pc in accordance with the discharge volume Qp of the pump 2. It follows that:

$$\begin{aligned} Qp &= C \times Z \times \sqrt{Pp - Pa} \\ &= C \times Z \times \sqrt{Pc} \end{aligned} \tag{2}$$

Thus, the discharge volume Qp of the pump 2 is determined by the product of the area Z of the throttle 20 and the root of the change-over pressure Pc of the valve 13. In the equation, C indicates a flow-rate coefficient. Therefore, the rate of flow to the actuator 3 is determined in accordance with the area Z of the throttle 20 which is variable in accordance with the stroke of the spool of the change-over valve 7. At this time, even though the oil flow is transmitted through the pressure reducing valve 25*a* into the actuator 3 and to the shuttle valve 21 connected to the port R, the pressure resistance at the pressure reducing valve 25*a* is only a small resistance due to a spring provided on the pressure reducing valve 25*a*, since the pilot pressures P1 and P2 acting on the pressure reducing valve 25*a* are substantially equal to each other.

When a boom and an arm are operated simultaneously during horizontal excavation or the like, both the change-over valves 7 and 8 are switched to change-over position L or M, the oil flows into the boom actuator 3 and the arm actuator 4 through the throttles 20 and 20 of the change-over valves 7 and B. When the load pressure Ps of the arm is lower than the load pressure Pa of the boom, the load pressure Pa of the boom is passed through the shuttle valve 21. In the shuttle valve 22, the load pressure Pa of the boom is compared with the load pressure Ps of the arm. Since the load pressure Pa of the boom is higher, it is passed through the shuttle valve 22. The load pressure Pa is transmitted to the valve 13 and also to the pressure reducing valves 25*a*, 25*b*, 26*a* and 26*b* of the actuators 3 and 4. The above-mentioned oil flow encounters a small resistance at the pressure reducing valves 25*a* and 25*b* of the boom, but a large pressure reduction Psa is achieved with respect to the load pressure Ps of the arm by the load pressure Pa of the boom and the energization force of the spring. The discharge pressure Pp of the pump is:

$$Pp = Ps + Pc + Psa \tag{3}$$

The discharge volume Qp of the pump 2 is controlled by the switching pressure or the valve 13 so that the oil flowing through the throttles 20 and 20 of the spools of the change-over valves 7 and 8 achieves a predetermined amount of pressure Pc.

Figure 3:
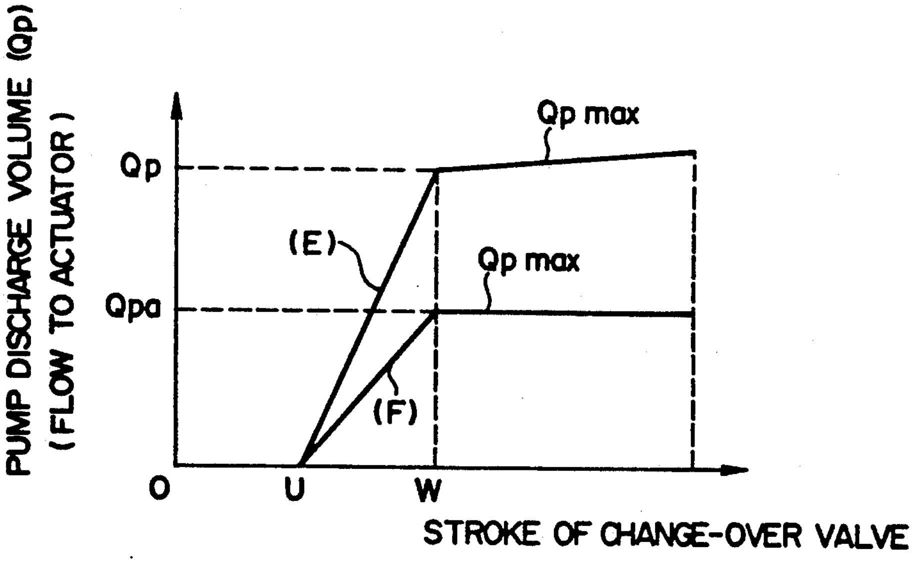
FIG. 3 is a chart illustrating the relationship between the stroke of a change-over valve spool and the rate of flow into an actuator in accordance with the present invention.
Figure 4:
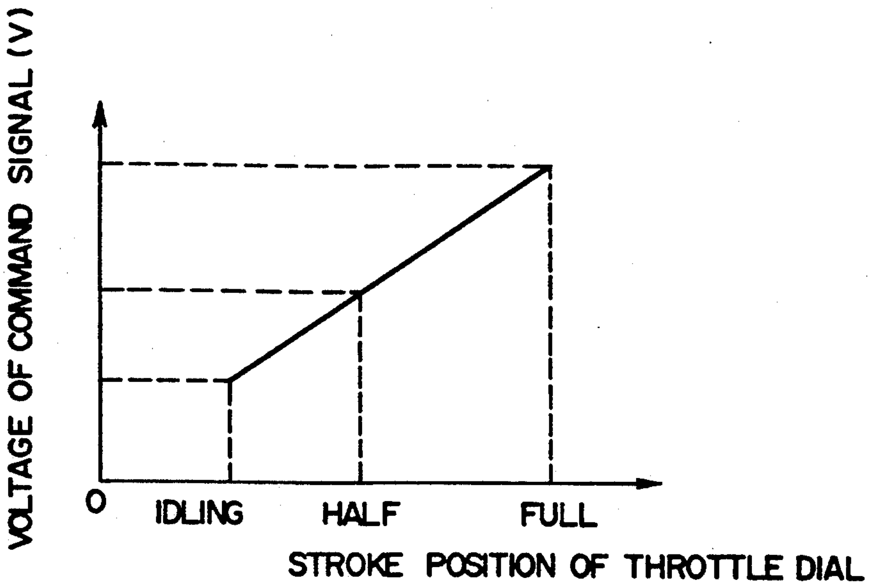
FIG. 4 is a chart illustrating the relationship between the stroke position of the throttle dial and the voltage of a command signal in accordance with the present invention.
Figure 5:
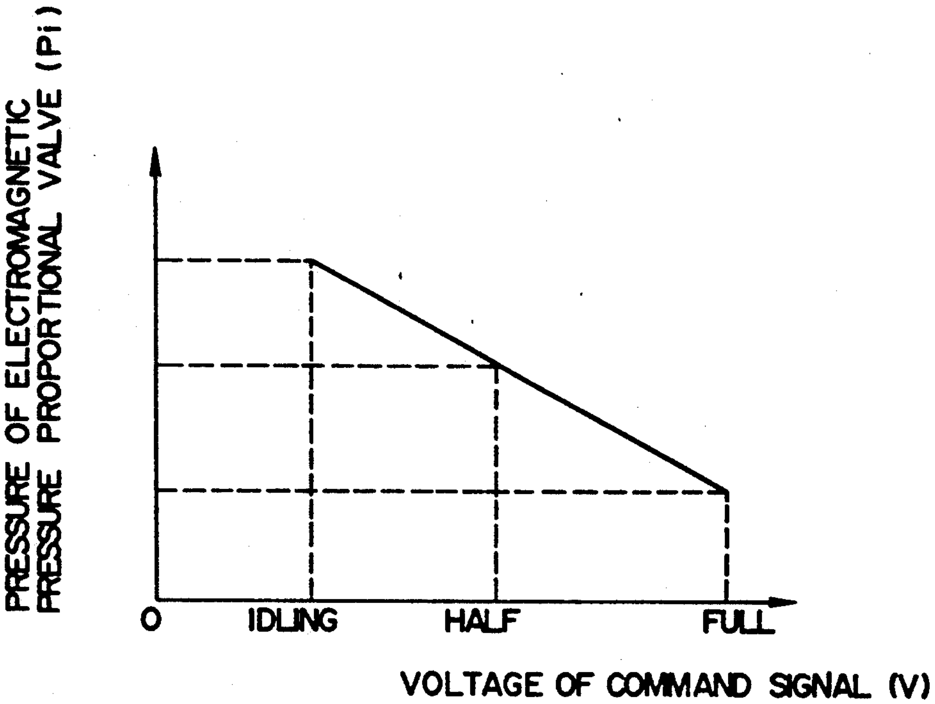
FIG. 5 is a chart illustrating the relationship between the voltage of a command signal from a throttle dial and the pressure of a pressure proportional valve in accordance with the present invention.
Figure 6:
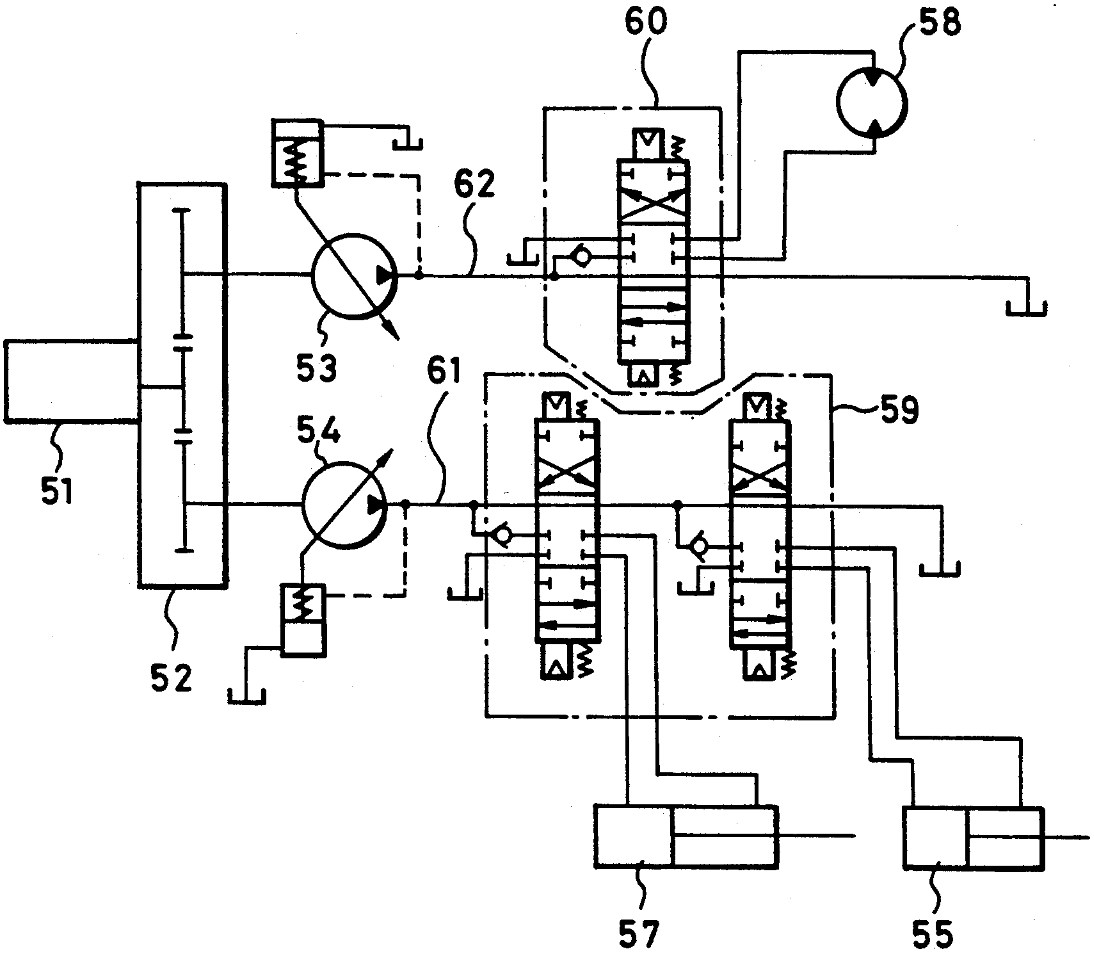
FIG. 6 (PRIOR ART)
FIG. 6 is an illustration of the entire construction of a hydraulic circuit of a conventional "two pumps/two valves"
Figure 7:
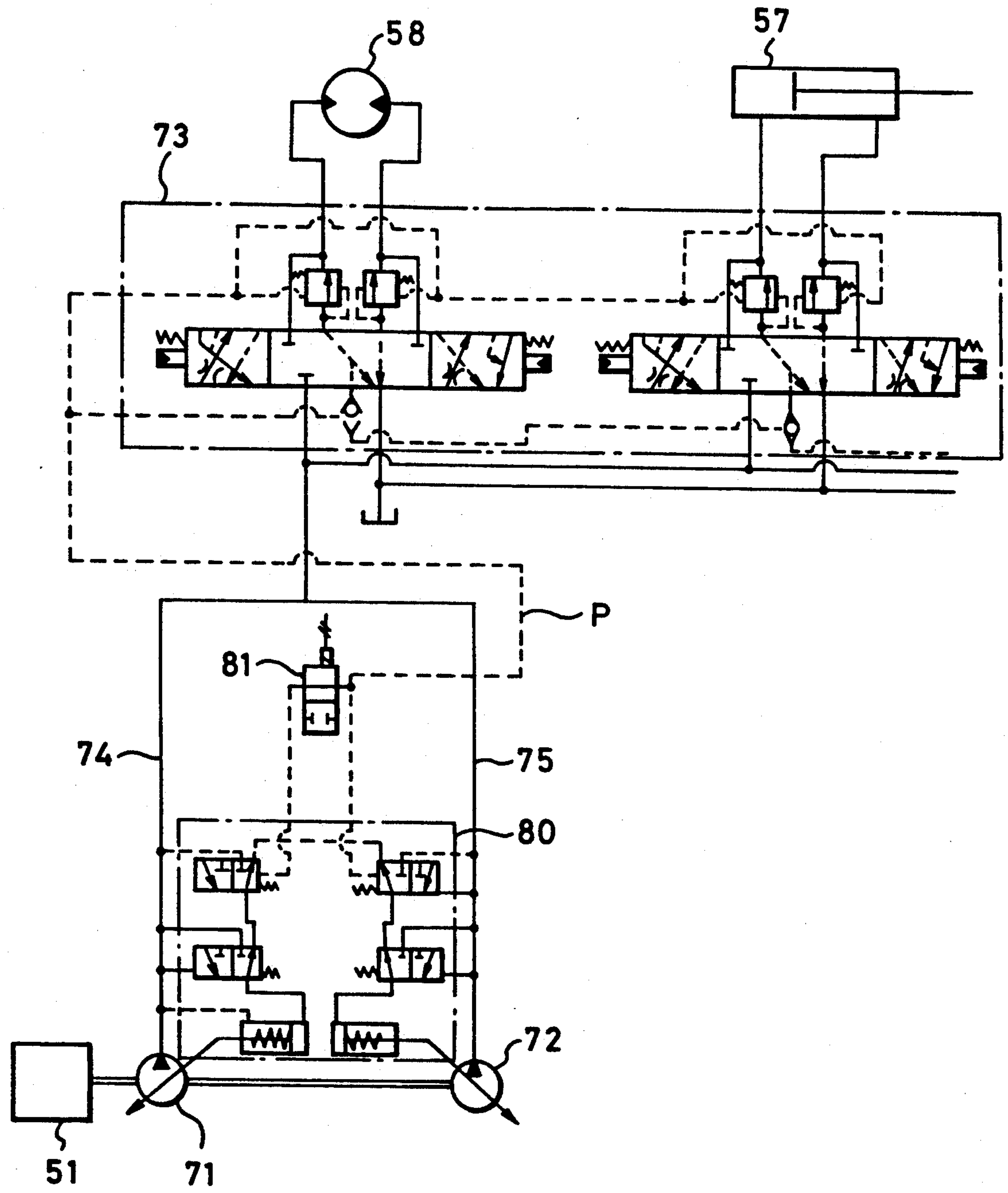
FIG. 7 (PRIOR ART)
FIG. 7 is an illustration of the entire construction of a conventional circuit capable of varying a pump discharge volume in a closed center-load sensing system.
Figure 8:
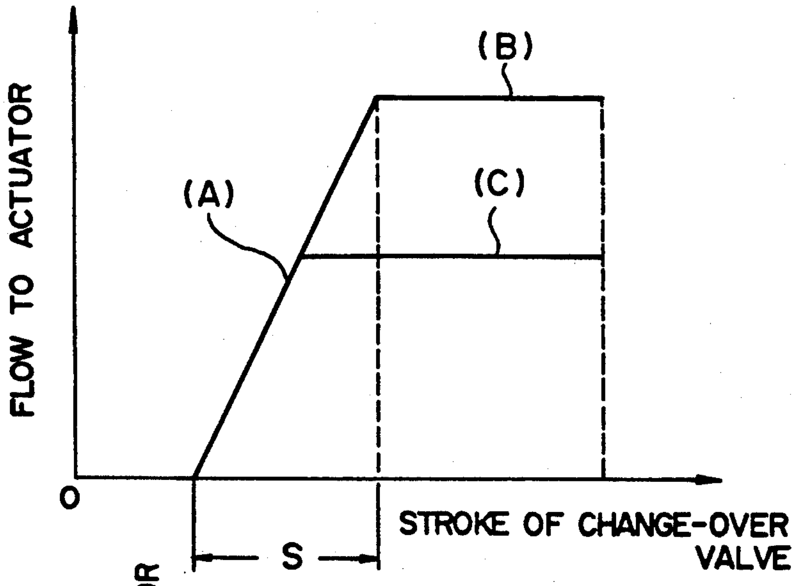
FIG. 8 (PRIOR ART)
FIG. 8 is a chart illustrating the relationship between the stroke of a change-over valve spool of the circuit shown in FIG. 7 and the rate of flow into the actuator.
Figure 9:
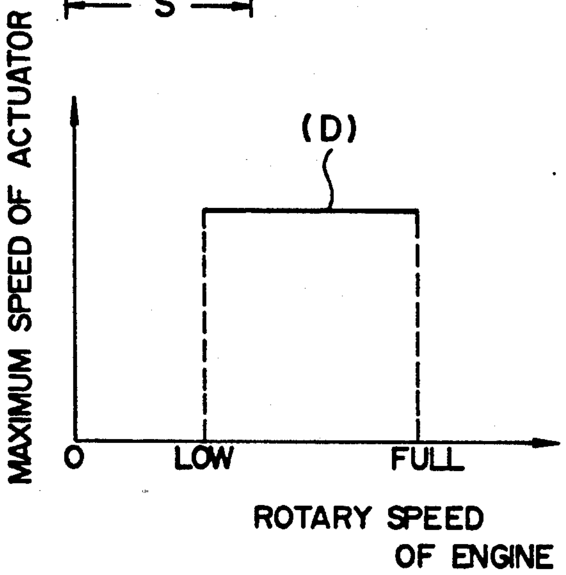
FIG. 9 (PRIOR ART)
FIG. 9 is a chart illustrating the relationship between the rotational speed of an engine of the circuit shown in FIG. 7 and the maximum speed of the actuator.
Figure 10:
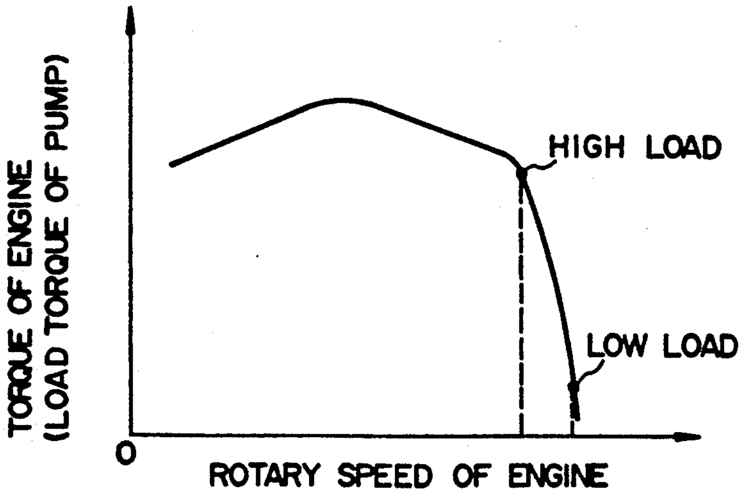
FIG. 10 (PRIOR ART)
FIG. 10 is a chart illustrating variations in the rotational speed of the engine.

At this time, when the accuracy of horizontal excavation or the like is improved by decreasing the discharge volume of the pump 2 from (E) to (F) as shown in FIG. 3, the change-over switch 40 is turned on to operate the controller 33, and then the throttle dial 31 is set at the desired rotational speed of the engine 1, which rotational speed is suitable for operations. For example, the voltage V of a command signal shown in FIG. 4 stored in the controller 33 is outputted to the electromagnetic pressure proportional valve 35 in accordance with the stroke position of the throttle dial 31. The electromagnetic pressure proportional valve 35 controls the pressure Pi to the regulator 16 as shown in FIG. 5 in accordance with the command signal regarding the oil pressure of the pump 17, and outputs the pressure to the regulator 16. The spring 16a inside the regulator 16 is slackened by the pressure Pi, and the mounting length of the spring 15 connected to the regulator 16 is changed, thereby reducing the pressing force on the valve 13. As a result, the switching pressure of the valve 13 is made lower than pressure Pc. As shown in FIG. 2, the discharge volume (or a rate of flow into an actuator) of the pump 2 varies in proportion to variations in the rotational speed of the engine 1.

Next, an example in which the change-over switch 40 is turned on to operate the controller 33 so that the boom actuator 3 is operated will now be explained. The change-over valve 7 is switched from the neutral position N to the change-over position L or M in accordance with the operation of the lever provided in proximity to the unillustrated operator's seat. If so, there is no supply of flow into the actuator 3 since the throttle 20 having an area Z provided on the spool does not open up until the U point of the stroke of the spool as shown in FIG. 3. Next, when the stroke of the spool reaches point W, the throttle 20 having an area Z becomes open and the switching pressure Pc of the valve 13 is lower than Pc, the rate of flow into the actuator 3 becomes small from Qp to Qpa in accordance with equation (2). Shifting of the stroke can be made variable by varying the switching pressure of the valve 13.

Although a command signal is varied at the first-order proportion with respect to variations in the rotational speed of the engine 1 in this embodiment, an ordinary controller can be used to vary the signal at the second-order proportion, third-order proportion, or at other continuous variations. Although the pressure to the regulator 16 is reduced, the pressure, on the contrary, can be increased or the energization force of the spring 15 can also be increased. In addition, although an example in which "one pump" is used has been explained in this embodiment, needless to say, the present invention may be-used for "two pumps/one valve".

INDUSTRIAL APPLICABILITY

The present invention is useful as a closed center-load sensing system capable of varying a pump discharge volume easily with a high degree of accuracy. The accuracy of a construction method such as horizontal excavation or normal excavation by, in particular, construction machines, is improved, making it possible for even a novice to operate the machine.

We claim:

1. Apparatus for varying a pump discharge volume via a closed center-load sensing system, said apparatus comprising:
   - a power source having a rotational speed output;
   - a variable volume hydraulic pump driven by the rotation speed output of the power source to discharge pressurized oil at a pump pressure;
   - a plurality of actuators, each actuator being driven by pressurized oil discharged from the variable volume hydraulic pump;
   - a plurality of change-over valves, each of said change-over valves controlling the flow of the pressurized oil from the variable volume hydraulic pump to a respective one of said plurality of actuators;
   - a closed center-load sensing system for determining an actuator load pressure and for controlling the rate of flow of pressurized oil discharged from the variable volume hydraulic pump so that the pressure difference between the pump pressure and the actuator load pressure is maintained at a predetermined value and the rate of flow of pressurized oil discharged from the variable capacity hydraulic pump is varied when the pressure difference between a pump pressure and an actuator load pressure varies;
   - an indicator for providing a set signal for setting the desired rotational speed of the power source;
   - a controller for computing and outputting a speed command signal for the desired rotational speed of the power source in response to the set signal from the indicator; and
   - a governor for controlling the rotational speed of the power source in response to said speed command signal from the controller, whereby the pressure difference between the pump pressure and the actuator load pressure is set by the indicator.

2. Apparatus in accordance with claim 1, wherein said power source is an engine.

3. Apparatus in accordance with claim 1, wherein said indicator is a throttle dial which sets the desired rotational speed of the power source in accordance with the stroke position of the throttle dial.

4. Apparatus in accordance with claim 1, wherein said controller has a change-over switch for operating the controller.

5. Apparatus in accordance with claim 1, wherein said governor is an electronic proportional control governor for controlling the rotational speed of the power source in response to said speed command signal from the controller.

6. Apparatus in accordance with claim 1, wherein said controller outputs a discharge volume command signal for the desired discharge volume of the variable volume hydraulic pump; and wherein said closed center-load sensing system comprises a pump regulator for varying the discharge volume of the variable volume hydraulic pump, and an electromagnetic pressure proportional valve for controlling the pump regulator in response to the discharge volume command signal.

7. Apparatus in accordance with claim 6, wherein said controller outputs said discharge volume command signal in response to said indicator.

8. Apparatus in accordance with claim 10, wherein said indicator is a throttle dial which sets the desired rotational speed of the power source in accordance with the stroke position of the throttle dial, and wherein said controller stores values of the discharge volume command signal in accordance with the stroke position of the throttle dial.

9. Apparatus in accordance with claim 8, wherein said power source is an engine.

10. Apparatus in accordance with claim 9, wherein said controller has a change-over switch for operating the controller.

11. Apparatus in accordance with claim 10, wherein said governor is an electronic proportional control governor for controlling the rotational speed of the power source in response to said speed command signal from the controller.

12. Apparatus in accordance with claim 1, wherein said controller outputs a discharge volume command signal for the desired discharge volume of the variable volume hydraulic pump; and wherein said closed center-load sensing system comprises a pump regulator for varying the discharge volume of the variable volume hydraulic pump, means to applying the said pump regulator a first signal representing the pump pressure of said variable volume hydraulic pump, a regulator valve for applying a second signal to said pump regulator, the changing of the position of the regulator valve being controlled by the pump pressure of the variable volume hydraulic pump acting on one end of the regulator valve and the maximum actuator pressure and a variable energization force spring acting on the other end of the regulator valve; and means for varying the energization force of said spring responsive to the discharge volume command signal.

13. Apparatus in accordance with claim 12, wherein said regulator valve has "three ports/two positions" construction.

14. Apparatus in accordance with claim 13, wherein said means for varying comprises a spring regulator for varying the mounting length of said spring, thereby varying the energization force thereof, a fixed volume pump, and an electromagnetic pressure proportional valve connected between said fixed volume pump and said spring regulator for controlling the pressure to said spring regulator, and means for applying said discharge volume command signal to said electromagnetic pressure proportional valve to thereby control the discharge volume of said variable volume hydraulic pump in response to the discharge volume command signal.

15. Apparatus in accordance with claim 14, wherein said power source is an engine, wherein said indicator is a throttle dial which sets the desired rotational speed of the engine in accordance with the stroke position of the throttle dial, and wherein said controller stores values of the discharge volume command signal in accordance with the stroke position of the throttle dial.

16. Apparatus in accordance with claim 15, wherein said governor is an electronic proportional control governor for controlling the rotational speed of the power source in response to said speed command signal from the controller.

17. Apparatus in accordance with claim 16, wherein said controller has a change-over switch for operating the controller.

18. A circuit capable of varying a pump discharge volume in a closed center-load sensing system, comprising:

a power source having a rotational speed;

a variable volume hydraulic pump driven by the power source to discharge a flow of pressure oil;

actuators driven by the pressure oil discharged from the variable volume hydraulic pump;

change-over valves for controlling the flow of the pressure oil to the actuators;

an indicator for setting the rotational speed of the power source in a load sensing system in which the rate of flow of a discharge from the variable volume hydraulic pump is controlled so that the pressure difference between the pump pressure and the actuator load pressure is maintained at a predetermined pressure and the rate of flow of a discharge from the variable capacity hydraulic pump is varied when the pressure difference between a pump pressure and an actuator load pressure varies;

a controller for computing and outputting a command signal for the rotational speed of the power source in response to a set signal from the indicator; and an electronic proportional control governor for controlling the rotational speed of the power source in response to a command signal from the controller, whereby the pressure difference between the pump pressure and the actuator load pressure is set by the indicator.

19. A circuit according to claim 18, wherein said indicator is a throttle dial for setting the rotational speed of the power source which is set in accordance with the stroke position of the throttle dial.

20. A circuit according to claim 18, wherein said controller has a change-over switch for operating the controller and an electromagnetic pressure proportional valve for controlling the regulator of the pump connected thereto.

* * * * *

UNITED STATES PATENT AND TRADEMARK OFFICE
CERTIFICATE OF CORRECTION

PATENT NO. : 5,317,871

DATED : June 7, 1994

INVENTOR(S) : Daijiro ITO and Hiroshi IMAI

It is certified that error appears in the above-identified patent and that said Letters Patent is hereby corrected as shown below:

Column 8, line 45, delete "claim 10" and insert --claim 7--.

Column 8, line 68, delete "to applying the" and insert --for applying to--.

Column 9, line 15, after "has" insert --a--.

Signed and Sealed this

Thirteenth Day of September, 1994

Attest:

BRUCE LEHMAN

*Attesting Officer*

*Commissioner of Patents and Trademarks*

UNITED STATES PATENT AND TRADEMARK OFFICE
CERTIFICATE OF CORRECTION

PATENT NO. : 5,317,871

DATED : June 7, 1994

INVENTOR(S) : Daijiro ITO and Hiroshi IMAI

It is certified that error appears in the above-identified patent and that said Letters Patent is hereby corrected as shown below:

Column 8, line 45, delete "claim 10" and insert --claim 7--.

Column 8, line 68, delete "to applying the" and insert --for applying to--.

Column 9, line 15, after "has" insert --a--.

Signed and Sealed this

Twenty-fifth Day of October, 1994

*Attest:*

BRUCE LEHMAN

*Attesting Officer*

*Commissioner of Patents and Trademarks*